United States Patent
Liow et al.

(10) Patent No.: US 7,327,647 B2
(45) Date of Patent: Feb. 5, 2008

(54) METHOD AND APPARATUS FOR GENERATING THE WOBBLE CLOCK SIGNAL

(75) Inventors: Stanley Liow, Hsin-Tien (TW); Kobe Chou, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 534 days.

(21) Appl. No.: 10/801,629

(22) Filed: Mar. 15, 2004

(65) Prior Publication Data

US 2005/0094514 A1    May 5, 2005

Related U.S. Application Data

(60) Provisional application No. 60/516,240, filed on Oct. 31, 2003.

(30) Foreign Application Priority Data

Feb. 23, 2004    (TW) ............... 93104403 A

(51) Int. Cl.
  *G11B 5/09*    (2006.01)

(52) U.S. Cl. ............... 369/47.27; 369/44.13; 369/47.18; 369/47.28

(58) Field of Classification Search .......... None
See application file for complete search history.

(56) References Cited

U.S. PATENT DOCUMENTS

| 6,236,629 B1* | 5/2001 | Hisakado et al. | 369/47.32 |
| 6,700,847 B2* | 3/2004 | Osada | 369/53.34 |
| 2003/0048120 A1* | 3/2003 | Chou | 369/53.34 |

* cited by examiner

*Primary Examiner*—William Korzuch
*Assistant Examiner*—Jorge L. Ortiz-Criado
(74) *Attorney, Agent, or Firm*—J.C. Patents

(57) ABSTRACT

A method for generating a wobble clock signal. When the wobble signal becomes deformed or a defect on the optical disc is found, the present invention provides a stable wobble clock signal, which is used to maintain a stable rotation speed when the optical disc is processed. In addition, the present invention also determines whether the wobble signal is deformed according to the result of comparing the width of the wobble signal at different status with the average of the half cycle width of the wobble signal.

13 Claims, 4 Drawing Sheets

METHOD AND APPARATUS FOR GENERATING THE WOBBLE CLOCK SIGNAL

CROSS-REFERENCE TO RELATED APPLICATION

This application claims the priority benefits of U.S. provisional application titled "A NEW CHIP DESIGN" filed on Oct. 31, 2003, Ser. No. 60/516,240. All disclosure of this application is incorporated herein by reference. This application also claims the priority benefit of Taiwan application serial No. 93104403, filed on Feb. 23, 2004.

BACKGROUND OF THE INVENTION

1. Field of the Invention

The present invention relates to a method and an apparatus for generating a wobble clock signal, and more particularly, to a method and an apparatus capable of maintaining a stable rotation speed when the optical disc is processed.

2. Description of the Related Art

In general, a shallow groove is spirally etched on the optical disc outwards from the center of the optical disc such as the CD-R, CD-RW, DVD-R, DVD+RW, or DVD-RW when the optical disc is manufactured, and this groove is called as a "pregroove". In fact, this pregroove is not a perfect spiral but with numerous wobbles. The "wobble" of the pregroove looks like a sinusoidal on the general press-made optical disc. Even this pregroove is so small and almost invisible, it can be detected by the optical driving unit in the optical drive apparatus, and the signal detected in the pregroove by the optical drive apparatus is a wobble signal whose frequency has been modulated. A certain time data is obtained after the wobble signal is demodulated by the optical drive apparatus, and this time data is referred as a "pregroove absolute time", which is used to assure of maintaining the stable speed when the optical drive apparatus is processing the signal on the optical disc. Therefore, whether or not the pregroove is correct, and whether or not the pregroove is accurately read become major topics of the optical driving apparatus and the optical disc.

For example, when burning a recordable optical disc, if there is a defect on the recordable optical disc, the recordable optical disc apparatus cannot accurately determine the pregroove absolute time, thus an unstable and wrong pregroove absolute time is obtained. This causes that the rotation speed of the motor in the recordable optical disc apparatus become unstable, and degrades the CD burning quality.

In addition, the defect on the optical disc also deforms the wobble signal. A pregroove absolute time is extracted from the wobble signal on every predetermined cycle in the conventional technique. Therefore, when the wobble clock signal is deformed due to the defect on some area of the optical disc, the pregroove absolute time of the subsequent normal area is also impacted and becomes incorrect. Thus the CD burning quality is significantly impacted.

SUMMARY OF THE INVENTION

The present invention provides a method for generating a wobble clock signal. When the wobble signal becomes deformed or a defect on the optical disc is found, the present invention can maintain a stable rotation speed of the recordable optical apparatus when the optical disc is processed.

The present invention also provides an apparatus for generating a wobble clock signal. The apparatus provides a wobble clock signal which is used to maintain a stable rotation speed when the optical disc apparatus is processing the optical disc, so as to improve the CD burning quality.

The method for generating the wobble clock signal provided by the present invention at least comprises following steps. At first, a wobble clock signal with a constant cycle is generated according to the wobble signal generated when the optical disc is processed. Then, the width of the wobble signal at different status is compared with an average of the wobble signals to product a comparison result. Finally, according to the comparison result, it is determined whether to continuously select the wobble signal to generate the wobble clock signal or to feedback the generated wobble clock signal back to be the signal source for generating the wobble clock signal itself.

Herein, the method further comprises following steps. The width of the wobble signal at different status is counted, such that a plurality of counting data is generated. A plurality of comparison data is generated according to the relationship between the counting data and the average mentioned above. It is determined whether or not to select the wobble clock signal and feedback it back to be the signal source for generating the wobble clock signal itself according to whether the comparison data is beyond a predetermined range or not.

Herein, following steps may be further comprised. When the comparison data is beyond the predetermined range, a deformation signal is enabled. Also, the number of continuously enabling the deformation signal is optionally counted. When the number of continuously enabling the deformation signal is over, a predetermined value, the wobble clock signal is selected and fed back to be the signal source for generating the wobble clock signal itself.

In the normal case, the average mentioned above is obtained by averaging the counting values. In addition, in order to avoid the noise interference and avoid the wrongly determining of the wobble signal as the deformed signal, a process of removing the fake signal could be applied on the wobble signal first.

According to another aspect of the present invention, a method for generating a wobble clock signal is provided by the present invention, and the method comprises following steps. The width of the wobble signal at different status is counted, such that a plurality of counting data is generated. Then, a wobble clock signal is generated according to an average of the counting data.

Herein, following steps may be further comprised. An average clock signal is generated according to an average of all counting data, and a wobble clock signal is then generated by dividing the frequency of the average clock signal by a positive integer N. In addition, the average of the counting data mentioned above generally indicates an average of the half cycle of the wobble signal.

Herein, when the wobble signal becomes deformed or a defect on the optical disc is found, the wobble clock signal may be selected and fed back to generate the wobble clock signal.

The method for determining whether the wobble signal is deformed or not could at least comprises following steps. The width of the wobble signal at different status is counted, such that a plurality of counting data is generated. Then, a plurality of comparison data is generated according to the relationship between the counting data and an average. It is determined whether or not to select the wobble clock signal and feedback it back to be the signal source for generating the wobble clock signal itself according to whether the comparison data is beyond a predetermined range or not.

According to another aspect of the present invention, the present invention provides an apparatus for generating a wobble clock signal so as to improve the quality of the optical disc processing. The apparatus at least comprises a clock signal generating circuit and a selection circuit, and may optionally comprise a deformation detecting module. A wobble signal is generated when the optical disc is processed, and the clock signal generating circuit generates a stable wobble clock signal according to the wobble signal or according to the signal source which is fed back from the wobble clock signal generated by itself. In addition, the deformation detecting module also receives the wobble signal, and obtains a result of comparing the width of the wobble signal at different status with an average. Then, the deformation detecting module determines whether or not to output a deformation enabling signal according to the comparison result. In addition, the deformation detecting module also electrically couples to the selection circuit, and sends the deformation enabling signal to the selection circuit when the deformation detecting module determines to output the deformation enabling signal. The selection circuit electrically couples to both the clock signal generating circuit and the deformation detecting module. In addition, the selection circuit receives the wobble signal and the signal fed back from the wobble clock signal, such that the output wobble signal or the signal source fed back from the wobble clock signal is selected and sent to the clock signal generating circuit. When at least one enabling signal is sent to the selection circuit, the selection circuit selects the signal source fed back from the wobble clock signal and sends it to the clock signal generating circuit.

In summary, when the wobble signal becomes deformed or a defect on the optical disc is found, the wobble clock signal itself may be selected and fed back to regenerate the wobble clock signal (to replace the original wobble clock signal by the newly fed back wobble clock signal). Since the wobble clock signal is a stable clock signal source, in the case of processing the optical disc, if the non-ideal situation mentioned above occurs, the stable wobble clock signal may be used to maintain the rotation speed of the optical disc apparatus (e.g. motor) so as to improve the CD burning quality.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1A:
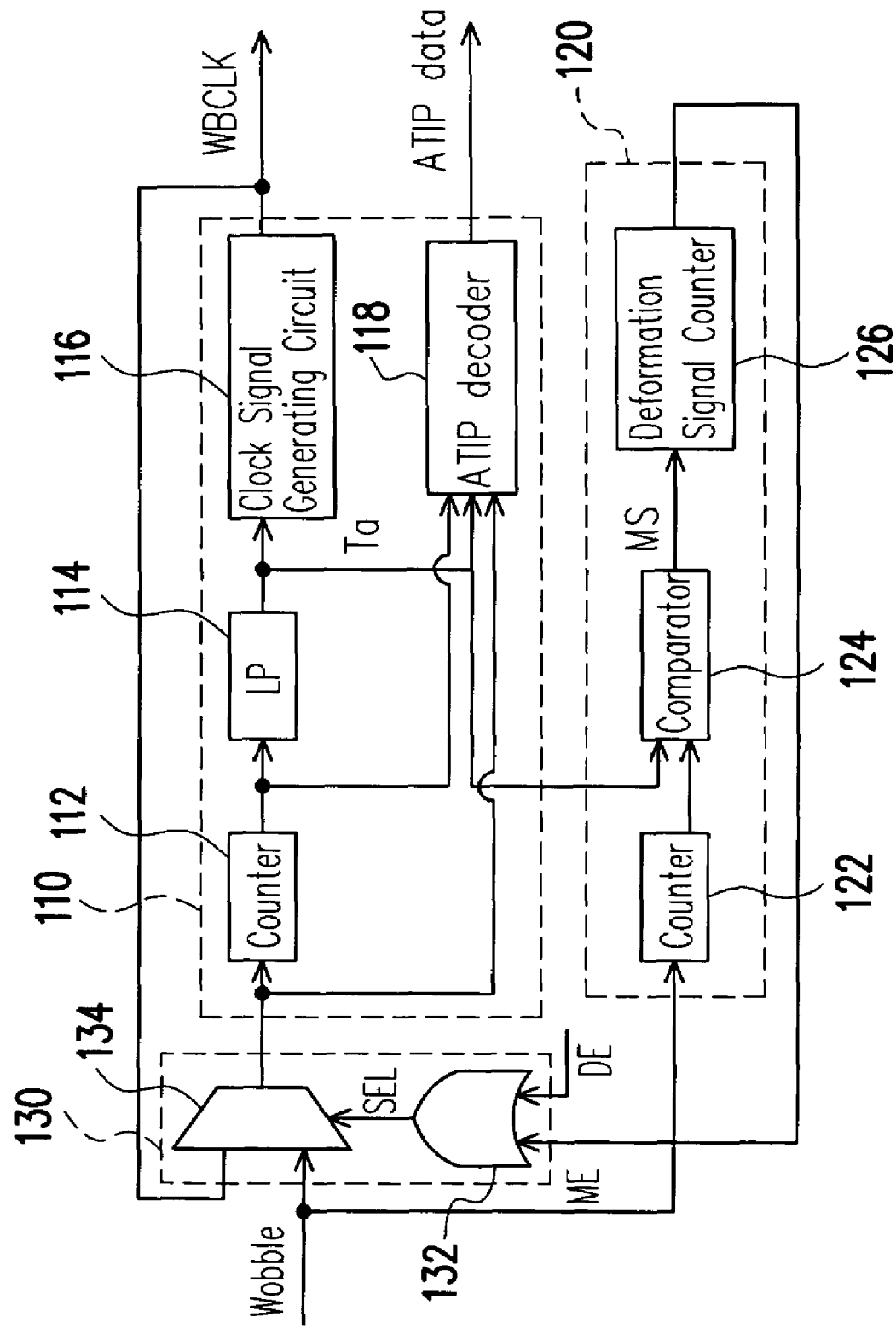
FIG. 1A is a block diagram of an apparatus for generating a wobble clock signal according to a preferred embodiment of the present invention.

FIG. 1A is a block diagram of an apparatus for generating a wobble clock signal according to a preferred embodiment of the present invention. Referring to FIG. 1A, the present invention is applied in the optical disc apparatus. In the present embodiment, a selection circuit 130 electrically couples to a clock signal generating circuit 110, and further electrically couples to an optional deformation detecting circuit 120. When the optical disc apparatus is processing the optical disc (e.g. when burning the optical disc), the selection circuit 130 receives a wobble signal (Wobble) and a wobble clock signal (WBCLK), and one of the signals is selected and sent to the clock signal generating circuit 110, so as to generate the stable wobble clock signal WBCLK. The WBCLK signal is used to maintain a stable rotation speed of the optical disc apparatus (e.g. motor).

Referring to FIG. 1A, in the clock signal generating circuit 110, a counter 112 electrically couples to the selection circuit 130 and a low-pass filter (LPF) 114, and the low-pass filter 114 further electrically couples to a clock signal generating circuit 116. Its operating principle is reviewed hereinafter in better detail, the selection circuit 130 receives the wobble signal Wobble and the wobble clock signal WBCLK (both signals are basically composed of square waves having different size), and one of the signals is selected and sent to the counter 112. The counter 112 counts the width of the signal which is at different status and sent from the selection circuit 130 (wherein, one high speed clock signal is commonly used to count the length of each square wave), such that a plurality records of counting data is generated. Then, a counting data signal FMPRD is generated and sent to the low-pass filter 114 according to the counting data. After the low-pass filter 114 receives the counting data signal, an average clock signal Ta (which is equal to the counting data after it is lightly modified) is obtained by averaging the counting data. Then, the low-pass filter 114 sends the average clock signal Ta to the clock generating circuit 116. After the clock generating circuit 116 receives the average clock signal Ta, the frequency of the average clock signal Ta is divided by N so as to obtain a wobble clock signal WBCLK, wherein N is a positive integer.

In the present embodiment, an average of half cycle of the wobble signal Wobble is commonly used to represent the cycle length of each average clock signal Ta. Therefore, the frequency of the average clock signal Ta is twice of the average frequency of the wobble signal Wobble. Although the average clock signal Ta is a quite stable clock signal, the present invention usually cannot directly use the average clock signal Ta to control the optical disc apparatus, it is because that the component (e.g. motor) of the optical disc apparatus is controlled by the clock signal whose frequency is similar to the frequency of the wobble signal Wobble, thus the frequency of the average clock signal Ta is still too high (such as to high to drive some mechanical pars). Therefore, a frequency dividing operation is usually performed on the average clock signal Ta by the clock generating circuit 116 in the present embodiment. In other words, the frequency of the average clock signal Ta is divided by N to generate an appropriate wobble clock signal WBCLK. In the present embodiment, for example, N is usually 2.

Although the average of half cycle of the wobble signal Wobble is used as the cycle length of the average clock signal Ta in the embodiment, the present invention is not necessarily limited by it. Its value may be modified by one of the ordinary skill in the art based on the physical requirement. In addition, the value of N may be modified according to the variance of the cycle length of the average clock signal Ta.

In addition, an ATIP decoding circuit 118 may be furthered installed inside the clock signal generating circuit 110. The ATIP decoding circuit 118 electrically couples to the selection circuit 130, the counter 112, and the low-pass filter 114. The pregroove absolute time data is generated based on the wobble signal Wobble or the wobble clock signal WBCLK, and with the cooperation of the difference signal FMPRD and the average clock signal. If the selection circuit 130 selects the wobble clock signal WBCLK as its output, the pregroove absolute time data generated by the ATIP decoding circuit 118 is not the real pregroove absolute time data on the recordable disc, instead it is a set of fake pregroove absolute time data. When a defect in found on some area of the optical disc, the clock generating circuit 110 generates this set of fake pregroove absolute time data, which is used to replace the original pregroove absolute time data. Therefore, although the pregroove absolute time data in the defect area is wrong, the pregroove absolute time data in the subsequent normal area is not impacted by it.

Referring to FIG. 1A, in the deformation detecting module 120, the counter 122 receives the wobble signal Wobble and electrically couples to a comparator 124. Wherein, the counter 122 and the counter 112 perform the same function, which are counting the width of the wobble signal Wobble at different status (wherein, one high frequency clock is commonly used to count how many clocks are mapped to for each different status). As a result, a plurality of records of counting data is generated and sent to the comparator 124. The comparator 124 compares all of the counting data with the average generated by the low-pass filter 114, and as long as one comparison result indicates that the difference between one record of the counting data and the average is beyond a predetermined range, the comparator 124 enables a deformation signal MS. The selection circuit 130 determines whether to enable a deformation enabling signal ME according to the deformation signal MS, such that the selection circuit 130 can select the feedback of the wobble clock signal WBCLK as its signal source for generating the wobble clock signal WBCLK.

In addition, a deformation signal counter 126 may be optionally designed in the deformation detecting module 120 for counting the number of the continuously enabling the deformation signal MS. The deformation signal counter 126 electrically couples to the comparator 124, when the number of the continuously enabling the deformation signal MS is beyond a predetermined value, the deformation enabling signal is enabled by the deformation detecting module 120.

Referring to FIG. 1A, the selection circuit 130 may comprise an OR gate 132 and a multiplexer 134. The OR gate 132 receives a defect enabling signal DE and the deformation enabling signal ME, wherein the defect enabling signal DE is generated when the defect is found on the optical disc. In addition, the output terminal of the OR gate 132 electrically couples to the multiplexer 134. One port of the multiplexer 134 receives the wobble signal Wobble, and the other port of the multiplexer 134 receives the wobble clock signal WBCLK. When any one of the defect enabling signal DE and the deformation enabling signal ME is enabled, the OR gate 132 enables a selection signal SEL on its output terminal, such that the multiplexer 134 can select the wobble clock signal WBCLK as its output, and sends it to the counter 112.

Figure 1B:
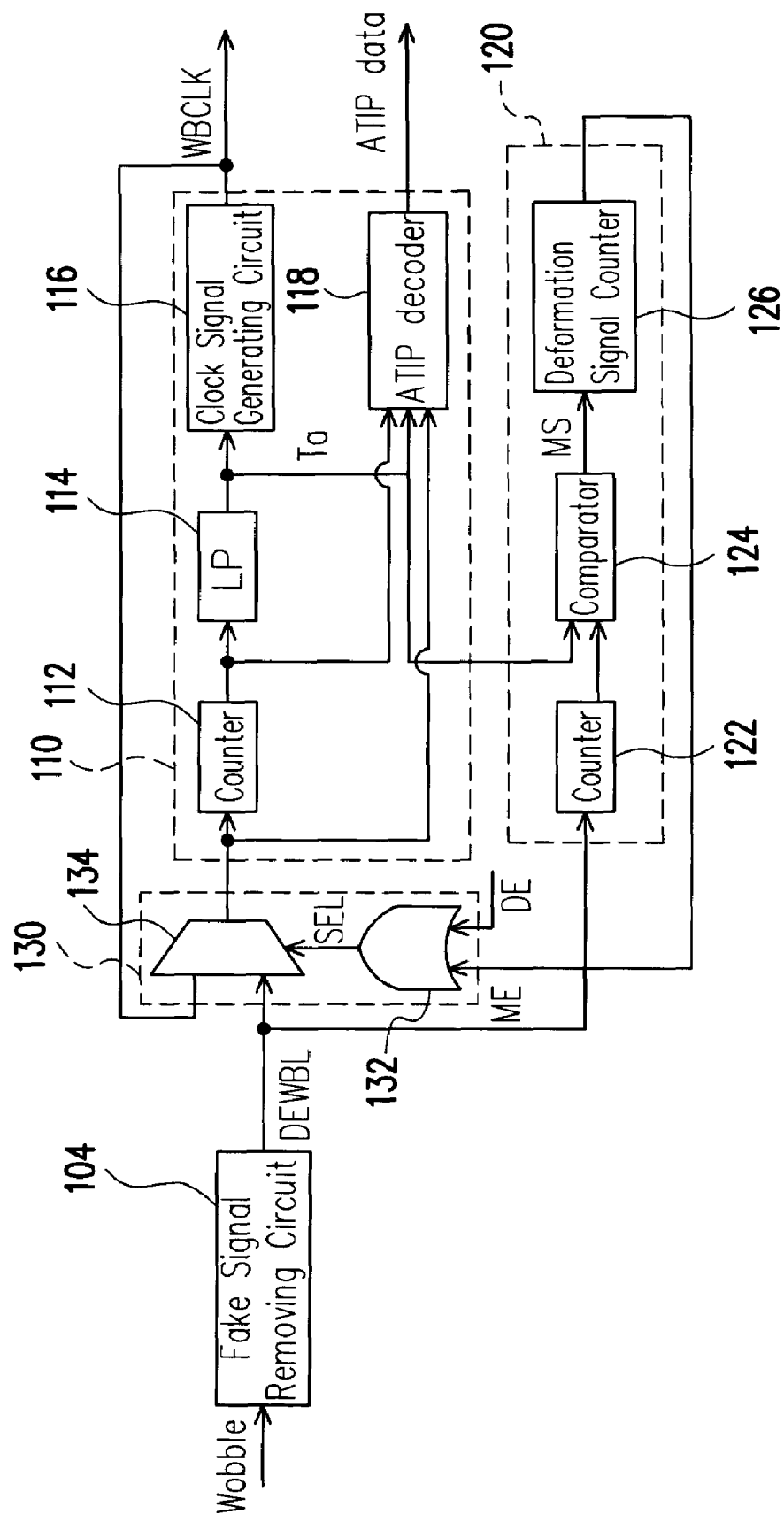
FIG. 1B is a block diagram of a circuit having a fake signal removing circuit for generating a wobble clock signal according to a preferred embodiment of the present invention.

FIG. 1B is a block diagram of a circuit having a fake signal removing circuit for generating a wobble clock signal according to another preferred embodiment of the present invention. Referring to FIG. 1B and comparing with FIG. 1A, the present embodiment is mainly characterized in that a fake signal removing circuit 104 is further designed. Since the wobble signal Wobble is easily interfered by the transient EMW (Electro Magnetic Wave) and fake signals are generated accordingly, the system is easily malfunctioned by these fake signals. Therefore, the fake signal removing circuit 104 receives the wobble signal Wobble, removes the fake signals from the wobble signal Wobble, and sends the signal to the multiplexer 134.

Figure 2:
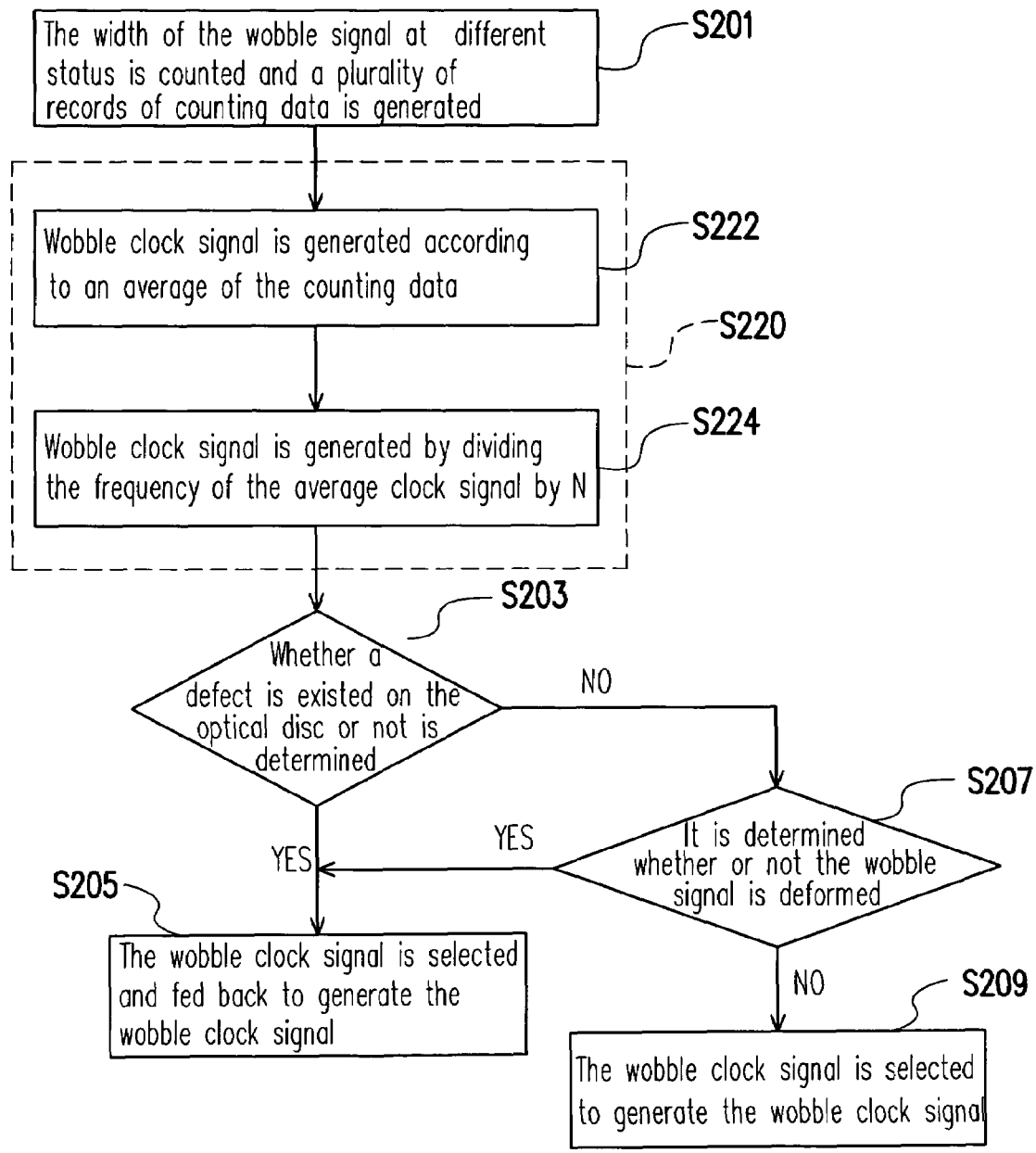
FIG. 2 is a flow chart illustrating a method for generating a wobble clock signal according to a preferred embodiment of the present invention.

FIG. 2 is a flow chart illustrating a method for generating a wobble clock signal according to yet another preferred embodiment of the present invention. A method for generating a wobble clock signal is provided by the preferred embodiment. Referring to FIGS. 1A, 1B, and 2, the method comprises following steps. At first, in step S201, the width of the wobble signal Wobble at different status is counted and a plurality of records of counting data is generated. Then in step S220, a wobble clock signal WBCLK is generated according to an average of the counting data. Whether a defect is existing on the optical disc or not is determined in step S203. If it is determined that a defect is existing on the optical disc (i.e. the "YES" branch of the step S203), the process moves to step S205, where the wobble clock signal is selected and fed back to generate the wobble clock signal. If it is determined that no defect is existing on the recordable optical disc (i.e. the "NO" branch of the step S203), the process moves to step S207, where it is determined whether or not the wobble signal Wobble is deformed. If it is determined that the wobble signal Wobble is deformed (i.e. the "YES" branch of the step S207), the process moves to same step S205, where the wobble clock signal is selected and fed back to generate the wobble clock signal (use the newly fed back signal to replace the original used signal). If it is determined that the wobble signal Wobble is not deformed (i.e. the "NO" branch of the step S207), the process moves to step S209, where the wobble signal is selected to generate the wobble clock signal.

Although the step S203 is performed before the step S207 in the present embodiment. In fact, the sequence of performing the step S203 and the step S207 does not impact the spirit of the present invention. Therefore, it can be freely modified by one of the ordinary skill in the art.

Moreover and more specific, the step S220 mentioned above may further comprises performing the step S222 first, where an average clock signal Ta is generated according to the average of the counting data. Then in step S224, a wobble clock signal WBCLK is generated by dividing the frequency of the average clock signal Ta by N.

Figure 3:
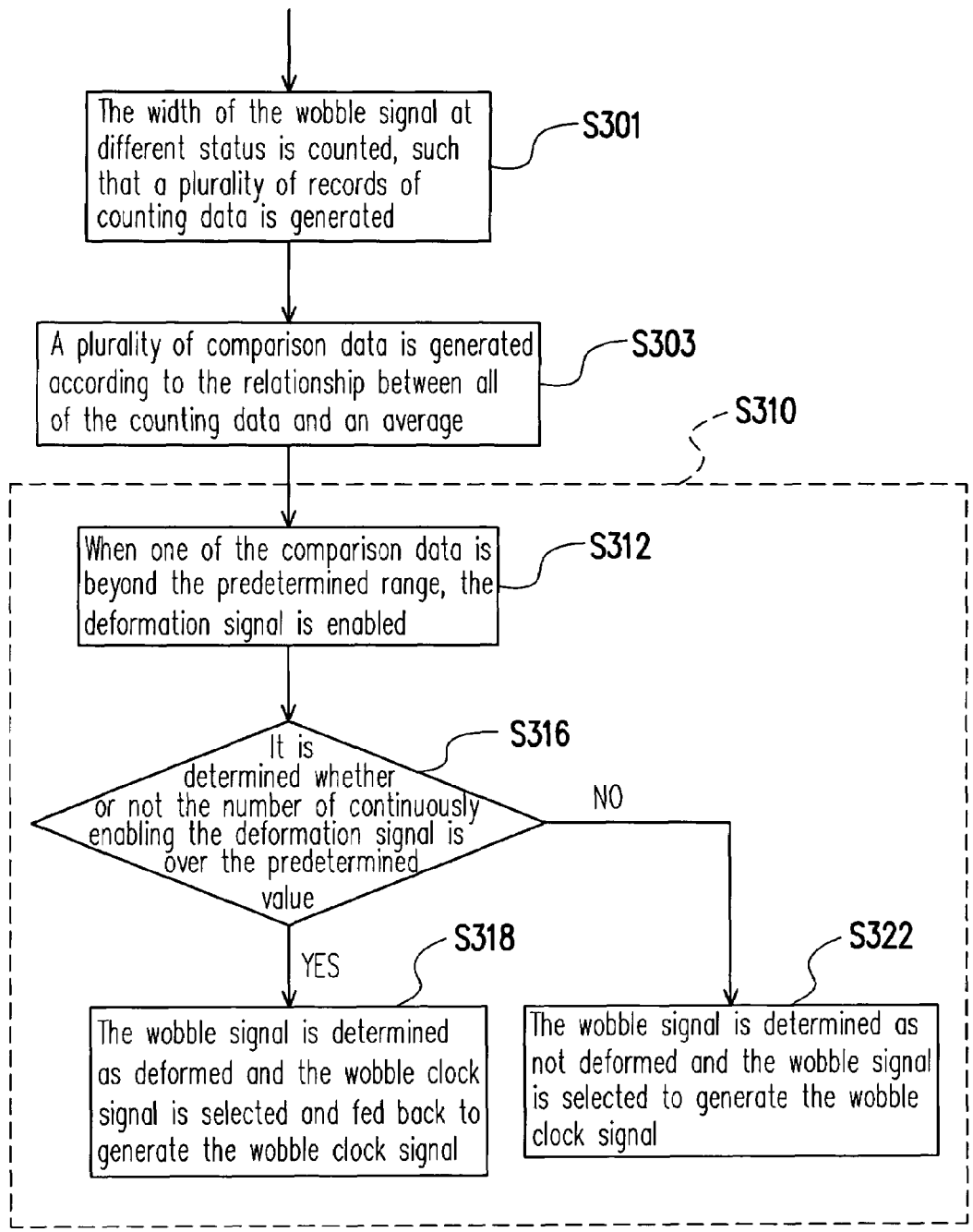
FIG. 3 is a flow chart illustrating a method for determining whether the wobble signal Wobble is deformed or not according to a preferred embodiment of the present invention.

FIG. 3 is a flow chart illustrating a method for determining whether the wobble signal Wobble is deformed or not according to a preferred embodiment of the present invention. Referring to FIGS. 1A, 1B, and 3, a method for determining whether the wobble signal Wobble is deformed or not is provided by the preferred embodiment, and the method comprises following steps. At first, in step S301, the width of the wobble signal Wobble at different status is counted, such that a plurality of records of counting data is generated. Then in step S303, a plurality of comparison data is generated according to the relationship between all of the counting data and an average. In the present embodiment, the average is commonly the average of all half cycle widths of the wobble signal Wobble. Then in step S310, it is determined that whether the wobble signal is deformed or not according to whether the comparison data is beyond a predetermined range or not.

More specifically, the step S310 may comprise following steps. As mentioned in step S312, when one of the comparison data is beyond the predetermined range, the deformation signal MS is enabled (herein, the number of continuously enabling the deformation signal is further counted). Then in step S316, it is determined that whether the number of continuously enabling the deformation signal MS is beyond a predetermined value or not. If it is determined that the number of continuously enabling the deformation signal MS is beyond the predetermined value (i.e. the "YES" branch of the step S318), the process moves to same step S316, where the wobble signal Wobble is determined as deformed and the wobble clock signal WBCLK is selected and fed back to generate the wobble clock signal WBCLK. If it is determined that the number of continuously enabling the deformation signal MS is not beyond the predetermined value (i.e. the "NO" branch of the step S318), the process moves to step S322, where the wobble signal Wobble is determined as not deformed and the wobble signal Wobble is selected to generate the wobble clock signal WBCLK.

In summary, the present invention at least has following advantages:

1. When the wobble signal becomes deformed or a defect on the optical disc is found, the present invention can generate a stable wobble clock signal to control the optical disc apparatus, such that a stable rotation speed can be maintained when the optical disc apparatus is operated in a CD burning mode.

2. When the wobble signal is deformed due to a defect on some area of the recordable optical disc, which causes the pregroove absolute time data cannot be accurately extracted, the present invention can generate a set of fake pregroove absolute data time, which is used to replace the original pregroove absolute data time. Therefore, the pregroove absolute data time in the subsequent normal area is not impacted by it.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for generating a wobble clock signal, comprising:
   counting a width of a wobble signal at different status which is generated when an optical disc is processed and generating a plurality of counting data;
   generating a wobble clock signal according to an average of the counting data; and
   feeding the wobble clock signal back to re-generate the wobble clock signal by replacing the original wobble clock signal, when either a defect is found on an optical disc or the wobble signal becomes deformed.

2. The method for generating the wobble clock signal of claim 1, further comprising:
   generating an average clock signal according to the average; and
   generating the wobble clock signal by dividing a frequency of the average clock signal by N, wherein N is a positive integer.

3. The method for generating the wobble clock signal of claim 2, wherein the average is an average of half cycle of the wobble signal.

4. The method for generating the wobble clock signal of claim 1, wherein whether or not the wobble signal becomes deformed is determined by the steps comprising:
   counting the width of the wobble signal at different status, so as to generate a plurality of counting data;
   generating a plurality of comparison data according to a relationship between each of the counting data and the average; and
   determining whether or not to select the wobble clock signal and feed the wobble clock signal back to generate the wobble clock signal according to whether the comparison data is beyond a predetermined range or not.

5. The method for generating the wobble clock signal of claim 4, further comprising:
   enabling a deformation signal when the comparison data is beyond the predetermined range; and
   selecting the wobble clock signal and feeding the wobble clock signal back to generate the wobble clock signal when a number of continuously enabling the deformation signal is beyond a predetermined value.

6. The method for generating the wobble clock signal of claim 4, wherein the average is the average of half cycle of the wobble signal.

7. An apparatus for generating a wobble clock signal, comprising:
   a clock signal generating circuit, for selecting one of a wobble signal, which is generated when an optical disc is processed, and a signal, which is fed back from the wobble clock signal, so as to generate the wobble clock signal; and
   a selection circuit, electrically coupled to the clock signal generating circuit for receiving the wobble signal and the signal fed back from the wobble clock signal, and for determining whether or not to allow the clock generating circuit to select the wobble clock signal and feed the wobble clock signal back to generate the wobble clock signal itself according to at least an enabling signal.

8. The apparatus for generating the wobble clock signal of claim 7, further comprising a deformation detecting module for receiving the wobble signal, and for determining whether or not to output a deformation enabling signal according to a result of comparing a width of the wobble signal at different status with an average, wherein the average is obtained by averaging a plurality of counting data generated by counting the width of the wobble signal at different status.

9. The apparatus for generating the wobble clock signal of claim 8, wherein the deformation detecting module comprises:
   a first counter for counting the width of the wobble signal at different status so as to generate the counting data; and
   a comparator electrically coupled to the first counter for comparing the counting data with the average so as to obtain a plurality of comparison data, wherein when the comparison data is beyond a predetermined range, the comparator generates a deformation signal, and the deformation detecting module determines whether or not to output the deformation enabling signal according to the deformation signal.

10. The apparatus for generating the wobble clock signal of claim 9, wherein the deformation detecting module further comprises a deformation signal counting circuit electrically coupled to the comparator for counting a number of continuously outputting the deformation signal, when the number of continuously outputting the deformation signal is greater than an average of the counting data, the deformation detecting module generates the deformation enabling signal.

11. The apparatus for generating the wobble clock signal of claim 7, wherein the clock signal generating circuit comprises:
- a second counter electrically coupled to the selection circuit, wherein the selection circuit receives the wobble signal and the wobble clock signal, selects and sends one of the signals to the second counter, and the second counter is used to count a width at different status of the signal input by the selection signal so as to generate a plurality of counting data;
- a low-pass filter electrically coupled to the second counter for generating an average clock signal by averaging the counting data; and
- a clock signal generating circuit electrically coupled to the low-pass filter for generating the wobble clock signal by dividing a frequency of the average clock signal by N, wherein N is a positive integer.

12. The apparatus for generating the wobble clock signal of claim 11, wherein the clock generating circuit further comprises a pregroove absolute-time decoding circuit electrically coupled to the selection circuit, the second counter, and the low-pass filter respectively for generating a pregroove absolute time data according to the counting data, the average clock signal, and one of the wobble signal and the wobble clock signal.

13. The apparatus for generating the wobble clock signal of claim 7, wherein the selection circuit comprises:
- a multiplexer for receiving the wobble signal and the signal fed back from the wobble clock signal, wherein the multiplexer is electrically coupled to the clock signal generating circuit for selecting and outputting one of the wobble signal and the signal fed back from the wobble clock signal to the clock signal generating circuit; and
- an OR gate for receiving the deformation enabling signal and a defect enabling signal which is generated when a defect is found on the recordable optical disc, and when at least one of the deformation enabling signal and the defect enabling signal is enabled, causing the multiplexer to select and send the signal fed back from the wobble clock signal to the clock signal generating circuit.

* * * * *